United States Patent [19]

Stoll et al.

[11] Patent Number: 5,796,008
[45] Date of Patent: Aug. 18, 1998

[54] PRESSURE GAGE DEVICE HAVING A TUBE SPRING ASSOCIATED WITH A VENTING VALVE TO ADJUST A PRESET

[75] Inventors: Kurt Stoll, Esslingen, Germany; Hendrik E. Smit, Rotterdam, Netherlands

[73] Assignee: Festo KG, Esslingen, Germany

[21] Appl. No.: 811,611

[22] Filed: Mar. 5, 1997

[30] Foreign Application Priority Data

Mar. 7, 1996 [DE] Germany .................. 196 08 868.2

[51] Int. Cl.⁶ .................. G01L 7/14; G01L 19/02
[52] U.S. Cl. .................................................. 73/740
[58] Field of Search .................. 73/732, 733, 734, 73/735, 736, 740, 741, 742, 743

[56] References Cited

U.S. PATENT DOCUMENTS 3,878,863  4/1975  Snyder .................. 137/557

FOREIGN PATENT DOCUMENTS

2 655 535 A  6/1991  France .
547 845 C    3/1932  Germany .
93 00 709 U  7/1993  Germany .

Primary Examiner—William L. Oen
Attorney, Agent, or Firm—Hoffmann & Baron, LLP

[57] ABSTRACT

A pressure gage device having a pressure gage with a double function. On the one hand it serves for conventional display of pressure and on the other hand it furthermore renders possible a variable setting of the displayed pressure.

14 Claims, 3 Drawing Sheets

PRESSURE GAGE DEVICE HAVING A TUBE SPRING ASSOCIATED WITH A VENTING VALVE TO ADJUST A PRESET

BACKGROUND OF THE INVENTION

The invention relates to a pressure gage device comprising a pressure gage of the spring tube type having a housing and being provided with a curved tube spring secured to the housing at one end thereof, an interior space of such spring being arranged to receive pressure medium via a pressure gage inlet, the spring tube having a degree of curvature which is dependent on the instantaneous actuating pressure obtaining in its interior space and being adapted to undergo a deformation in the form of an expansion or contraction in response to a change in the actuating pressure, and a display means coupled with the tube spring, whose reading is dependent on the instantaneous degree of deformation of the tube spring.

THE PRIOR ART

Pressure gage devices of this type are employed on an extensive scale in the pneumatic field in order to provide readings for the pressure obtaining in compressed air lines. The pressure gage comprises a tube spring, which is also termed a bourdon spring, in the form of a flexible spring constituted by a circularly bent metal tube with, as a rule, a cross section flattened on two sides. With a change in the degree of pressure action in the interior space in the tube spring same assumes a greater or less degree of curvature, the deformation occurring as part of an expansion or contraction of the arcuate curvature being transmitted to a display means, by which, in cooperation with a suitable scale, a reading for the pressure is displayed. Accordingly for providing a reading for the pressure the deformation due to the action of pressure in the interior of the tube spring is employed which is proportional to the acting pressure force in the interior space in the tube spring, and suitable mechanical or electrical means rendering possible an amplified display effect, when the deformation occurring during operation is small.

Accordingly such known pressure gage devices render possible an indication of the instantaneous pressure in a compressed air line or in some other piece of pneumatic equipment. Such pressure may be set to a desired value, for example by using a so-called pressure regulating valve, which is frequently referred to as a pressure reducing valve. Such a pressure reducing valve is for example disclosed in the text book "Pneumatische Steuerungen", by W. Deppert and K. Stoll, published by Vogel-Verlag, fourth edition 1977, pages 22 and 23.

Measures so far adopted for resetting to a desired pressure necessitate a complex design of the component employed.

SHORT SUMMARY OF THE INVENTION

One object of the invention is to ensure a simplification of the features relevant for the mechanical design and handling necessary for setting a pressure to be read from the pressure gage.

In order to achieve these and/or other objects appearing from the present specification, claims and drawings, in the context of a pressure gage of the type initially mentioned in the present invention the tube spring is provided with a venting valve adapted to control a venting opening communicating with the interior space in the tube spring, an adjusting device being present for resetting a preset value for the condition of switching of the venting valve in a manner dependent on the degree of deformation of the tube spring.

It is in this manner that a pressure gage device is created, which not only performs an indicating function pure and simple, but furthermore may simultaneously be employed as a means for presetting to a desired pressure. The tube spring possesses a venting valve which dependent on the condition of switching closes or opens a venting opening which connects the interior space of the tube spring with the surroundings and is preferably designed in the form of a fine nozzle. The respective condition of switching of the venting valve in this case is dependent, like the reading of the display means, on the degree of deformation of the tube spring. The adjusting device renders possible an adjustable preset of the switching condition in a manner dependent on the degree of deformation of the tube spring so that the venting valve may initially be closed if the tube spring has a substantial curvature in order to then to adopt an open position after a certain degree of expansion as caused by the cooperation with the setting means. When the venting opening is open it is possible for medium under pressure to flow from the interior space in the tube spring so that the actuating pressure will diminish and the tube spring will be deformed by way of a contraction. This means that the venting valve will be closed again. This operation may be repeated many times over, an equilibrium becoming generally established between the pressure medium leaving by way of the venting opening and a resulting actuating pressure which corresponds to the preset as determined by the adjustment means. By adjustment of the setting device it is possible for the actuating pressure to be changed and set at any desired value, it being possible to simultaneously take a reading for the instantaneous pressure value using the display device.

The tube spring of the pressure gage is consequently fitted with a self-regulating venting valve, preferably of a small overall size, and using the adjusting means may consequently be extremely simply set to the desired pressure. Accordingly the pressure gage device, normally employed for taking a reading for a pressure, is at the same time able to be utilized as a means for accurately setting a desired pressure, more particularly in connection with pressure regulating equipment, in the case of which the actuating pressure, which becomes established, is able to be employed as a control pressure.

Further advantageous developments of the invention are defined in the claims.

A pressure gage design has been found to be particularly advantageous in the case of which the venting valve possesses a moving closure member associated with the venting opening and which is resiliently biased into a closed setting closing the venting opening, an actuating portion being provided on the closure member which is displaced along a displacement path during a deformation of the tube spring, during whose actuation into an open position the valve member is able to be moved in relation to the tube spring into an open position rendering possible escape of pressure medium from the interior space in the tube spring and the adjusting means possesses an adjustment abutment arranged on the housing and which is so arranged in the path of displacement of the actuating portion, that, during a deformation of the tube spring representing an expansion, same may run up against the adjustment abutment and may be urged upon by same in the opening direction, the adjustment abutment being able to be positioned in different preset positions along the displacement path of the actuating portion.

In order to facilitate adjustment to the desired pressure the adjustment means preferably possesses a setting member arranged adjustably on the housing and preferably able to be set manually from the outside, said setting member cooperating with the venting valve. This setting member may be extremely easily operated, if it possesses a setting ring mounted in a rotatable fashion on the pressure gage's housing. In this respect, in order to have a particularly simple mechanical design, the setting ring may be constituted by the side wall of a cover cap which covers over the display device is at least partially transparent and on which the setting abutment may be mounted. Accordingly there is no need for separate setting means.

A pressure regulating unit may be associated with the pressure gage, the operating pressure acting as the control pressure in the regulating unit. It is in this manner that the invention provides a compact pressure gage device, wherein a pressure gage and a pressure regulating means are combined, the control pressure, which counteracts the secondary pressure present at the outlet of the pressure regulating unit, being able to be set using the pressure gage. Since the control pressure is able to be set on the pressure gage side, it is possible for the normally provided mechanical spring means counteracting the secondary pressure, to be dispensed with, which has frequently permitted only an inaccurate adjustment of the secondary pressure. As compared with a change in the bias of the spring the use of the adjustment means renders possible a substantially easier, and more accurate adjustment, which in the case of a setting member provided with a setting ring, may be performed by simple rotation like the adjustment of a camera lens, no high spring forces having to be overridden.

In the case of a combination of the pressure gage with a pressure regulating means the pressure gage utilized for setting the pressure practically serves as a pilot control means for the pressure regulator acting as an amplifier.

Given a suitable design it is possible for additional functional modules to be arranged between the pressure gage and the pressure regulating unit. Such functional modules may for example comprise switching elements, via which the pressure gage device may be remotely controlled or by direct manual operation, may be turned on and off, and furthermore for instance the function of a safety valve may be integrated therein or a possibility may be presented for the connection of a diagnostic and/or control device.

In what follows the invention will be described with reference to the accompanying drawings.

DETAILED ACCOUNT OF WORKING EMBODIMENTS OF THE INVENTION

The pressure gage device 1 depicted in FIGS. 1 through 6 possesses two functional units in the form of a pressure gage 2 and a pressure regulator device 3. The pressure gage has a twin function, that is to say being employed for indicating pressure and furthermore for setting the pressure, it serving as a pilot control unit, as part of the pressure setting system, for the pressure regulator unit.

Figure 1:
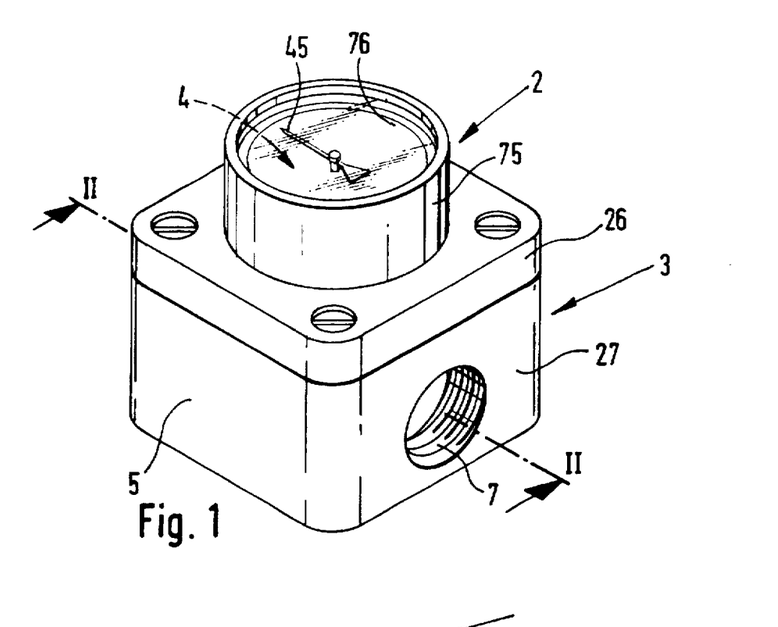
FIG. 1 shows a first constructional form of the pressure gage device of the invention in a perspective view, same being composed of a pressure gage and a pressure regulating unit.
Figure 2:
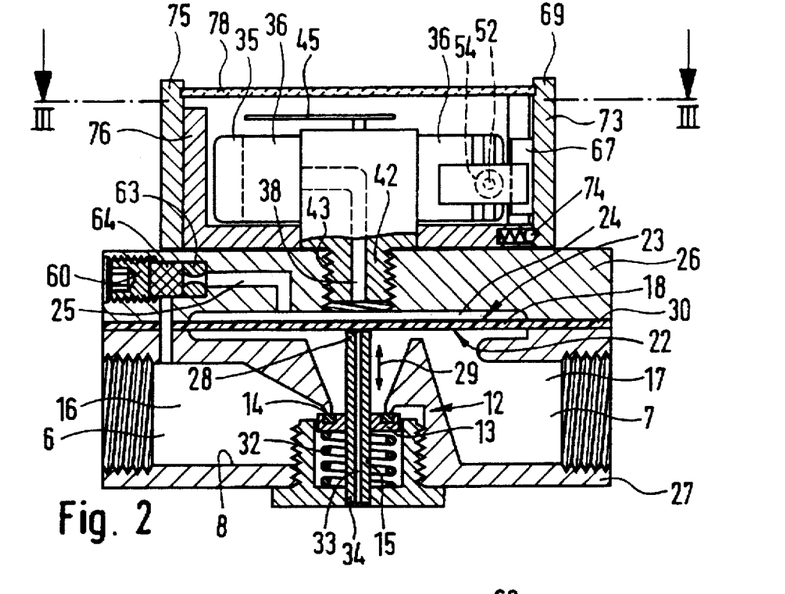
FIG. 2 shows the pressure gage device in accordance with FIG. 1 in a longitudinal section taken on the line II—II of FIG. 1.

In the preferred configuration of the design the pressure gage 2 possesses a cylindrical shape and via its housing 4 is secured to one of the lateral faces of the preferably cubic pressure regulator housing 5.

The pressure regulating unit 3 has a primary pressure inlet 6 and a secondary pressure outlet 7, which are connected via a principal flow duct 8 with one another. With the primary pressure inlet 6 a source of pressure medium 9 may be connected. The secondary pressure outlet 7 serves for connection with one or more loads, not illustrated in detail, which are to be operated using a pressure which is smaller than the primary pressure provided by the source 9 of pressure medium.

In the principal duct 8 of the pressure regulating unit 3 there is an intermediate control valve 12. Same possesses a moving valve member 13, which is designed in the form of seat valve member and in the illustrated closed position is in sealing engagement with a valve seat 14 surrounding the principal duct 8 and accordingly interrupts the fluid connection between the primary pressure inlet 6 and the secondary pressure outlet 7.

The presence of the control valve 12 means that the principal duct 8 is divided up into an inlet section 16 and an outlet section 17.

The valve seat 14 cooperates with an actuating plunger 15, which extends into the outlet section 17 as far as an actuating member 18, preferably in the form of a flexible diaphragm. The actuating member 18 constitutes a moving wall of the outlet section 17, its face facing the outlet section 17 forming a first actuating face 22, which is constantly acted upon by the secondary pressure obtaining in the outlet section 17.

The actuating member 18 separates the outlet section 17 from a control chamber 24. The face, opposite to the first actuating face 22, of the actuating member 18 constitutes a second actuating face 23, which faces the control chamber 24.

The actuating member 18 is able to be moved in the direction as indicated by the double arrow 29 of switching of the valve member 13 in relation to the regulator housing 5, although its circumferential edge 30 makes sealing contact with the regulator housing 5. In the case of the illustrated preferred design of diaphragm the actuating member 18 has its circumferential edge 30 sealingly held between two housing parts 26 and 27, which are joined together, of the regulator housing 5.

The actuating plunger 15 connected with the valve housing 13 has its associated end 28 in contact with the first actuating face 22 of the actuating member 18, when same, owing to a balanced action on its actuating faces 22 and 23, assumes the inactive position illustrated in FIG. 2. Then the valve member 13 is in the closed position. This closed position is stabilized by the differential primary and secondary pressures, acting on the valve member 13, it furthermore being possible for a spring 32 to be which is between and bears against the regulator housing 5 and the valve member 13 and urges the latter into the closed setting thereof. This spring serves more especially also to prevent flutter of the valve member 13 when it frequently responds.

The level of the outlet side pressure (secondary pressure) present at the secondary pressure outlet 7 is dependent on the control pressure present in the control chamber 24. If the latter is larger than the secondary pressure, then the actuating member 18 will be displaced downward toward the outlet section 17, it lifting, by means of the actuating plunger 15 engaging it, the valve member 13 clear of the valve seat 14 so that medium under the higher primary pressure may flow out of the inlet section 16 into the outlet section 17. If then the secondary pressure reaches the level of the control pressure in the control chamber 24 the actuating member 18 will return back into the inactive position, the valve member 13 also returning into the closed position owing to the spring 32.

If the control pressure obtaining in the control chamber 24 goes below the secondary pressure, the actuating member 18 will shift toward the control chamber 24 and will come clear of the actuating plunger 15. Then the actuating member 18 will clear an escape duct 33 extending through the actuating plunger 15, such escape duct 33 opening on the one hand at the face of the end 28 facing the actuating member 18 and on the other hand at the opposite end 34, which is connected with the atmosphere, of the actuating plunger 15. It is now possible for pressure medium to escape from the outlet section 17 through the escape duct 33, the secondary pressure then going down until the actuating member 18 returns into its inactive position owing to the pressure-related balance of forces acting on it.

Preferably in this case as well the control valve 12 has an escape valve integrated in it, which renders possible a simple and automatic reduction of the secondary pressure without separate valves having to be included.

The pressure medium responsible for the control pressure in the control pressure 24 which in the present pneumatic application will be compressed air—originates for example from the inlet section 16 of the principal duct 8. Such duct is connected with the control chamber 24 via a control duct 25.

The pressure gage 2 arranged on the pressure regulating unit 3 is a bourdon type gage and possesses a circularly arcuate, curved resiliently elastic and more particularly metallic tube element, which will be termed the spring tube 36. As shown in FIG. 1 at 35 the cross section of the tube is similar to a rectangle, the wall sections of the tube spring radially directed in relation to the center of curvature being flattened. Such a tube spring is also known as a bourdon spring.

The tube spring 36 has its one end 37 secured to the pressure gage housing 4. This secured end 37 is associated with the pressure gage inlet 38, via which the hollow interior space of the tube spring 36 is able to receive pressure medium, in the present case compressed air. The supply of the said pressure medium takes place from the control chamber 24, which communicates with the pressure gage inlet 38. In the present example the pressure gage inlet 38 is provided at the end of a connection pipe 42, secured to the pressure gage housing 4, such pipe being screwed into a connection port 43 in the regulator housing 5, such port 43 having a screw thread and opening into the control chamber 24.

The display of the pressure level by the pressure gage is based on an elastic deformation of the tube spring 36 in a fashion dependent on the pressure obtaining in it, such pressure being termed the actuating pressure. In the case of a small actuating pressure the tube spring 36 will assume a configuration with a greater curvature, i.e. more curved, which is indicated in continuous lines in FIG. 3. With an increase in the actuating pressure the tube spring 36 expands to express a reduction in its curvature. As indicated in chained lines in FIG. 4 at 41 there is a corresponding degree of deformation with a smaller curvature of the spring.

The display of pressure takes place using a display means 44 coupled with the tube spring 36. For example an analog display means may be provided, the display means 44 possessing a pointer 45 more particularly mounted for rotation about the center of curvature of the tube spring 36, such pointer cooperating with a scale, not illustrated in detail. Furthermore the display means 44 possesses a transmission means 46, which is coupled adjacent to a free end 47 of the tube spring 36 with the pointer 45 so that the deformation of the tube spring 36 brings about a deflection of the pointing and there is a indication of the instantaneous degree of deformation of the tube spring.

In the case of pressure gages of conventional design the tube spring 36, apart from the pressure gage inlet 38, is sealed off in a fluid tight fashion. As a departure from this the tube spring 36 of the pressure gage 2 in accordance with the invention is furnished with a venting opening 52, via which the interior space 48 in the tube spring 36 can be connected with the surroundings, i.e. with the atmosphere. The venting opening 52 is controlled by a venting valve 53 arranged on the tube spring 36, such valve 53 possessing a moving closure member 54 associated with the venting opening 52. The venting opening 52 is preferably in the form of a nozzle or jet opening with an extremely small fluid aperture or cross section.

Figures 3, 4:
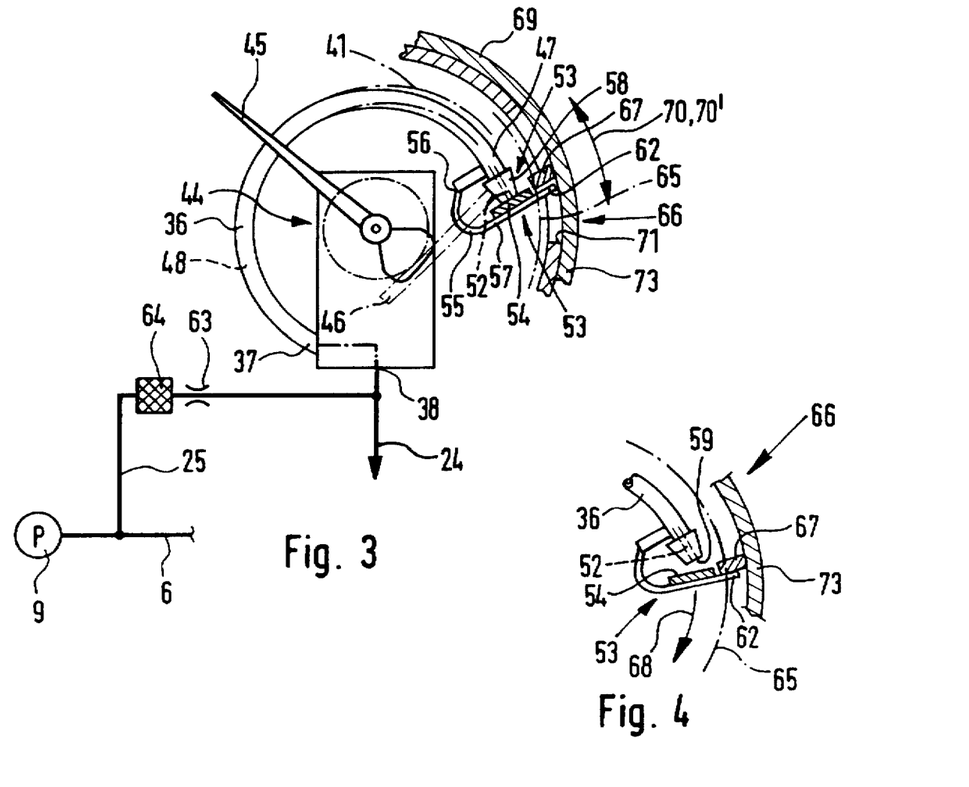
FIG. 3 is a diagrammatic plan view of the pressure gage device generally on the line III—III of FIG. 2, the venting valve being illustrated in the closed setting thereof.
FIG. 4 shows the portion of the tube spring bearing the venting valve as in FIG. 3, the venting valve assuming an open setting.

The closure member 54 can be moved between a closed position as shown in FIG. 3 and an open one illustrated in FIG. 4. In the closed position the venting opening is closed by the closure member 54 and escape of pressure medium from the interior space 48 of the tube spring 36 is prevented. Preferably, the closure member 54 is biased by spring force into the closed position. A spring 55 bearing against the tube spring 36 urges the closure member 54 in the said direction. In the present example, the spring 55 at the same time constitutes the support of the closure member 54, it preferably being designed in a form like a strip spring. In this case the spring 55 has its one end 56 connected with the tube spring 36, whereas its free elastically displaceable section 57 bears the closure member 54.

In the illustrated, preferred embodiment the venting opening 52 opens at the face of the free end 47 of the tube spring 36. Here it is possible for the tube spring 36 to bear a seat member 58, on which a valve seat 59 surrounding the venting opening 52 is formed. The closure member 54 is designed in the form of a cover element, which in the closed position seals against the valve seat 59 in a manner comparable with the function of a seat valve.

In the open position depicted in FIG. 4 the pressure medium located in the tube spring 36 has available an outlet cross section which is of smaller or larger size dependent on the deflection of the closure member 54. The opening of the venting valve 53 takes place by lifting the closure member 54 from the valve seat 59, the spring acting in the closing direction being overridden.

The closing force of the spring 55 is preferably of such a size that the maximum actuating pressure occurring during operation of the pressure gage device in the interior space 48 is not by itself sufficient to switch over the venting valve 53 into the open position. A displacement of the closure member 54 into the open position is only possible because additionally an actuating portion 62, firmly connected with the closure member 54, is mechanically acted upon or urged in the opening direction.

The actuating pressure obtaining in the tube spring 36 may accordingly be influenced by the respectively selected setting of the closure member 54. When the venting valve 53 is open, the actuating pressure will be reduced, whereas when the venting valve 53 is closed the actuating pressure may increase.

In order to limit the flow of pressure medium into the tube spring 36, a choke 63 is provided in the control duct 25 connected with the primary pressure inlet 6. It reduces the volumetric flow. The choke 63 is conveniently preceded by a filter 64 to prevent dirt from blocking up the choke 63 or the venting opening 52, which is preferably also extremely small in size. The venting opening 52 is preferably designed with a jet- or nozzle-like, fine cross section, this also preferably applying for the choke 63.

Preferably, the choke 63 is constituted by a ring part inserted in the control duct 25, the fine ring opening constituting the choke 63. The ring part and the filter 64 are in the present example held in place by a screw 60.

When there is a deformation of the tube spring 36 caused by the a change in the actuating pressure the actuating portion 62 of the venting valve 53, arranged for joint or common motion on the tube spring 36 is shifted, it moving along a displacement path indicated in FIGS. 3 and 4 in chained lines. The actuating portion 62 is for instance constituted by the free end of the spring 55.

An adjustment means arranged in a fixed manner on the housing and cooperating with the actuating portion 62 renders possible a variable preset for the condition of switching of the venting valve 53 in a fashion dependent on the degree of deformation of the tube spring 36. Therefore a preset is possible in such a fashion that the venting valve assumes a certain switching position in a manner dependent on the degree of deformation of the tube spring 36. In the present embodiment of the invention this adjustment means 66 possesses an adjustment abutment 67, bearing against the housing, which extends into the displacement path 65 of the actuating portion 62 and may be positioned steplessly to assume a different preset using a positioning means arranged in accordance with the double arrow 70 along the displacement path 65. The adjustment abutment 67 is so associated with the actuating portion 62 that in the case of a deformation of the tube spring 36 occurring during expansion the actuating portion 62 may abut against the adjustment abutment 67 and on further expansion is able to be acted upon by the adjustment abutment 67, which is stationary in relation to the tube spring 36, in the opening direction indicated by the arrow 68.

In the present example the actuating portion 62 extends radially past the curved tube spring 36. The adjustment abutment 67 is located on the side, facing the free end 47 of the tube spring 36, of the actuating portion 62. If owing to reduction in curvature of the tube spring 36 the actuating portion 62 comes to engage the adjustment abutment 67, the closure member 54, owing to continued expansion of the tube spring 36, will be moved clear of the valve seat 59, which is moving away from the closure member 54. The relative movement necessary for this between the closure member 54 and the valve seat 59 is ensured by the yielding spring 55.

The desired preset of the adjustment abutment 67 may be simply reset manually with the aid of a setting member 69, which is mounted on the pressure gage housing 4 for adjustment in the direction as indicated by the double arrow 70'. It is for instance constituted by a cylindrical setting ring 73, which is mounted coaxially on the pressure gage housing 4 and for example held in an axially fixed fashion on the pressure gage housing 4 while being capable of rotation, for example by means of a detent action—detent means being indicated at 74.

Preferably, the setting ring 73 is constituted by the circumferentially extending side wall of a cover cap 75, which is mounted on the pressure gage housing 4 and which at the end has a transparent wall 78, which in the mounted state is placed in front of the pointer 45 and renders possible reading of the pressure gage. By simple rotation of the cover cap 75 it is accordingly possible to position the adjustment abutment 67 in the desired fashion.

The pressure gage housing 4 illustrated in the example possesses a bell-like shape with a circumferentially extending cylindrical side wall 76. This side wall 76 serves for centering and rotatably mounting the cover cap 75 mounted thereon, which is also bell-like.

The adjustment abutment 67 is constituted by a projection, which in the embodiment of FIGS. 2 and 3 is arranged on the inner side of the setting ring 73, extends through a slot 71, extending in the peripheral direction, in the side wall 76 of the pressure gage housing 4, and projects into the said path 65 of displacement.

It is preferred for securing means, not illustrated in detail, to be present, with which the selected preset may be fixed in a releasable manner. Such securing means may be constituted by thread elements on the housing and on the setting member, which owing to the friction existing between them prevent accidental rotation of the setting ring 73. It would also be possible for example to arrange a clamping element on the setting member 69, such element being able to be clamped against the pressure gage housing 4.

Figure 5:
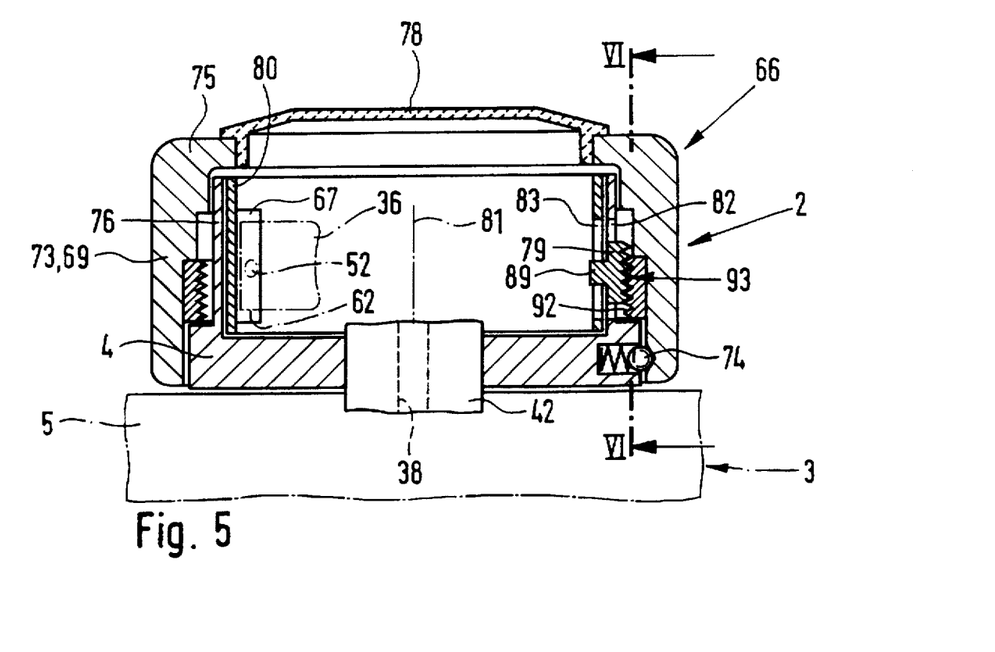
FIG. 5 shows a further possible design of the pressure gage device having an adjustment device possessing a particularly advantageous adjustment mechanism, the pressure regulating unit, the tube spring and the diaphragm not being illustrated, in longitudinal section.
Figure 6:
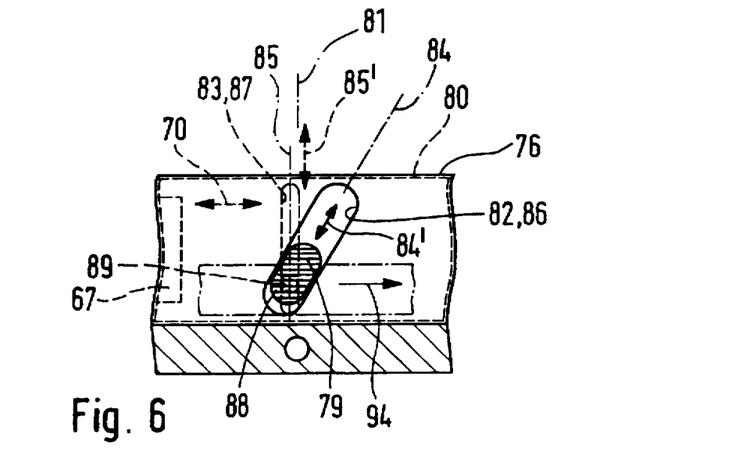
FIG. 6 shows a portion of the pressure gage device in accordance with FIG. 5 in a section taken on the line VI—VI of FIG. 5, the housing having been omitted.

FIGS. 5 and 6 show a pressure gage 2, whose adjustment means 66 comprises a particularly advantageous adjustment mechanism. Same permits adjustment of the setting abutment 67 in a manner similar to the adjustment of camera lenses. A particular advantage is that a stepless adjustment together with automatic locking of the selected preset is possible, the whole arrangement being extremely economical in space requirements. The overall size is not larger than in the case of a pressure gage of conventional design is only unsubstantially so.

While with the design in accordance with FIGS. 2 and 3 the adjustment abutment 67 is directly set on the setting ring 73, in the case of FIGS. 5 and 6 it is similar to the extent that it again bears against the housing, but it is designed separately from the setting ring 73, with which it is coupled for ganged motion by means of a linking member 79.

The adjustment abutment 67 is fixed on a bearing part 80, which in the example is sleeve-like in design and is arranged coaxially within the annularly extending side wall 76 of the pressure gage housing 4. The bearing part 80 is able to be rotated jointly with the adjustment ring 67, arranged on it, in relation to the pressure gage housing 4, the axis of rotation, indicated in broken lines, preferably coinciding with the center of the curved tube spring 36 and the axis of rotation of the pointer 45.

Starting at the annular bearing part 80 the adjustment abutment 67 extends radially inward into the path of displacement of the actuating portion 62.

At one point of its circumference the side wall 76 possesses an elongated opening 82, which is set at an oblique angle, and whose direction 84 has components running in the peripheral direction 94 of the side wall 76 and simultaneously in the axial direction 81. This opening 82 is radially opposite to a further opening 83, also of elongated form, in the bearing part 80, the direction 85 of such opening 83 diverging from the direction 84. In the example the direction 85 of the second opening 83 is axial.

The two openings 82 and 83 constitute a first and a second guide 86 and 87 for the above mentioned linking member 79. Same extends simultaneously into both guides 86 and 87 and is hence guided for sliding movement in the above mentioned first direction 84 as indicated by the double arrow 84' in relation to the pressure gage housing 4 and in the second direction 85 as indicated by the double arrow 85" in relation to the bearing part 80.

In the present example the linking member 79 has a head 88, which runs in the first guide 86, and a linking projection 89 extending inward radially starting from said head 88, said projection 89 running in the second guide 87.

Given actuation of the linking member 79 in the axial direction 81 the linking member 79 will be displaced along the first guide 86 obliquely axially and at the same time in the peripheral direction 94 of the side wall 76. The axial component of movement in this case has no effect on the setting of the bearing part 80, seeing that the linking projection 89 may move without obstruction in the axial direction 81 along the second guide 87. In contrast to this the component of movement in the peripheral direction of the side wall 76 (see arrow 94) gives rise to an entrainment of the bearing part 80 owing to the interlocking connection between the linking projection 89 and the second guide 87 so that the bearing part 80 is caused to perform a rotary movement about the axis 81 and causes a displacement of the adjustment abutment 67 in the positioning direction 70.

The action necessary for this on the linking member 79 is performed via the setting ring 73. At its inner periphery same has a circumferentially extending thread 92, which in the given example is arranged on the inner periphery of a threaded ring fixed on the setting ring 73. On its side facing the setting ring 73 the linking member 79 is provided on its head 88 with teeth 93 extending in parallelism to the turns of the thread 92, such teeth engaging the thread 92 with a screw threaded engagement. If now the setting ring 73, which is axially fixed by detent means 74, is turned the consequence is that the linking member 79 is shifted along the second guide 87 inward or outward dependent on the direction of rotation.

Accordingly rotation of the setting ring 73 in the settling direction 70' leads to a displacement of the adjustment ring 67 with a certain step-down effect, in the setting direction 70, which is in the same direction. Owing to the step-down effect produced extremely fine adjustment is possible. Simultaneously the mechanism described ensures that forces occurring in the case of contact with the actuating portion 62 with the adjustment abutment 67 are unable to cause any accidental change in the preset which has been selected. Every preset selected is accordingly practically automatically protected against accidental disturbance.

It will be clear that the alignment of the two guides 86 and 87 may be the reverse of the directions in the example described herein so that the first guide 86 would extend axially and the second guide would extend obliquely. Moreover, it would also possible for both guides 86 and 87 to have an oblique alignment. In accordance with the selected inclination and the ratio of the inclinations of the two guides 86 and 87 the drive ratio for the adjustment of the preset may be selected as required.

During operation of the pressure gage means there will be a choked flow of compressed air via the control duct 25 into the control chamber 24 and the pressure gage connected therewith on application of the primary pressure to the primary inlet 6. Owing to the then increasing actuation pressure the tube spring 36 will expand and the pointer 45 will point to the value for the respective pressure on the scale.

As part of the expansion movement the actuating portion 62, which is initially at a fair distance from the adjustment abutment 67, will come closer to the adjustment abutment 67. The distance moved before reaching the adjustment abutment 67 is dependent on the selected preset. When the actuating portion 62 reaches the adjustment abutment 67 then the spring-loaded closure member 54 will be moved clear of the venting opening 52 which in the illustrated embodiment has a nozzle bore with a diameter of approximately 0.3 mm to 0.5 mm. It is convenient for the bore of the choke 63 to also be in this range of size.

Between the pressure medium flowing in via the choked control duct 35 and the pressure medium flowing out via the venting opening 52 an equilibrium will become established, same resulting in an actuating pressure, corresponding to the preset, in the tube spring 36. This at the same time acts as a control pressure for the pressure regulating unit 3 so that a corresponding secondary pressure setting is made by same.

If the adjustment abutment 67 is shifted counterclockwise toward the attached end 37 of the tube spring 36 the venting valve 53 will close. As a consequence the actuating pressure will increase. Accordingly there is a further expansion of the tube spring 36 until the actuating portion 62 again cooperates with the adjustment abutment 67 and again, owing to an identical rate of inlet and outlet flow of the pressure medium, an equilibrium will be established which is at a higher actuating pressure.

A shift in the position of the adjustment abutment 67 in the clockwise direction, i.e. in the opening direction 68 of the closure member 54, will lead to release of a larger escape flow cross section at the venting opening 52 than would be necessary for maintaining the current actuating pressure. This results in a reduction in pressure in the tube spring 36 so that the tube spring immediately contracts and more or less follows the adjustment abutment 67 until an equilibrium is restored.

The display means 44 indicates the respectively obtaining actuating pressure, which preferably is the same as the resulting secondary pressure. It is in this manner that the pressure gage 2 may be employed for setting pressure and also simultaneously for taking a reading for the pressure.

When a set pressure has become established in equilibrium, the closure member 54 will assume an open position, wherein the escape rate of the pressure medium per unit time is the same as the rate of pressure medium arriving via the control duct 25 in the tube spring 26. Owing to the extremely small flow cross sections in the control duct 25 and in the venting opening 52 air losses are negligible.

Figure 7:
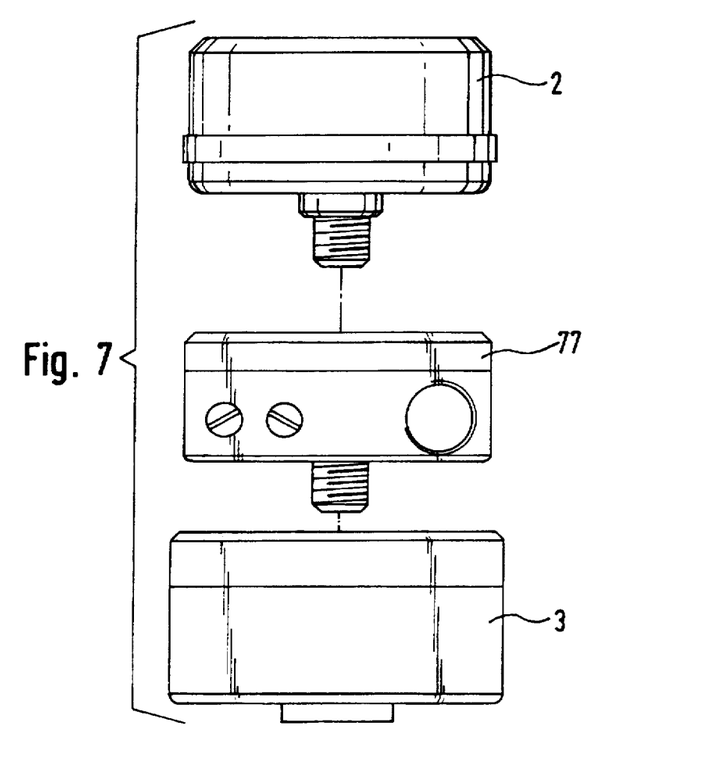
FIG. 7 shows pressure gage device of FIG. 1 with the pressure gage and the pressure regulating illustrated separated from one another, an optional intermediate functional unit being illustrated in an exploded view.

It will be seen from FIG. 7 that between the pressure regulating unit 3 and the pressure gage 2 at least one intermediate functional unit 77 may be placed if required, with which the operation of the pressure gage device 1 may be altered and/or by which, in a manner dependent on the operational state of the pressure gage device 1, certain functions may be performed. It would also be feasible to design a functional unit 77 as a start/stop functional unit, by whose operation the optional state of the pressure gage device 1 could be programmed or selected. Furthermore it would be feasible as well provide a functional unit with a integrated safety valve would have pressure switches. Moreover it would be possible to provide a converter unit to convert pressure signals current signal and furthermore a diagnostic unit or a control unit.

We claim:

1. A pressure gage device comprising a pressure gage of the spring tube type having a housing and being provided with a curved tube spring secured to the housing at one end thereof, an interior space of such spring being arranged to receive pressure medium via a pressure gage inlet, the spring tube having a degree of curvature which is dependent on the instantaneous actuating pressure obtaining in its interior space and being adapted to undergo a deformation in the form of an expansion or contraction in response to a change in the actuating pressure, and a display means coupled with the tube spring, whose reading is dependent on the instantaneous degree of deformation of the tube spring, wherein the tube spring is associated with a venting valve adapted to control a venting opening communicating with the interior space in the tube spring, an adjusting device being present for resetting a preset for the condition of switching of the venting valve in a manner dependent on the degree of deformation of the tube spring.

2. The pressure gage device as set forth in claim 1, wherein the venting valve possesses a movable closure member adapted to cooperate with the venting opening, said closure member being biased by spring force into a closed position closing the venting opening, the closure member is connected with an actuating portion adapted to move along a displacement path on deformation of the tube spring, action on the actuating portion in an opening direction being accompanied by a movement of the closure member in relation to the tube spring into an open position rendering possible escape of the pressure medium from the interior space of the tube spring, and wherein the adjustment means possesses an adjustment abutment bearing against the housing, such adjustment abutment being so arranged in the path of displacement of the actuating portion that when there is a deformation of the tube spring in the form of an expansion the actuating portion may come into engagement with the adjustment abutment and may be acted upon by same in the opening direction, the adjustment abutment being adapted to be set at different positions of preset along said displacement path of the actuating portion.

3. The pressure gage device as set forth in claim 2, wherein the adjustment means comprises a setting member which is adjustably carried on the pressure gage housing and is able to be operated from the outside, said setting member being adapted to serve for positioning the adjustment abutment.

4. The pressure gage device as set forth in claim 3, wherein the setting member comprises a setting ring rotatably mounted on the pressure gage housing.

5. The pressure gage device as set forth in claim 4, wherein the setting ring is constituted by the side wall of a cover cap which is at least partially transparent, covers the display means and is able to be rotated in relation to the pressure gage housing.

6. The pressure gage device as set forth in claim 3, wherein the adjustment abutment is fixedly secured to the setting member.

7. The pressure gage device as set forth in claim 3, wherein for selecting the presets the adjustment abutment is able to be moved in relation to the pressure gage housing in a positioning direction coinciding with the adjustment direction of the setting member and, said pressure gage device furthermore comprising a first guide connected with the pressure gage housing, a second guide connected with the adjustment abutment and furthermore a linking member simultaneously running on both guides and acted upon by the setting member, said linking member being shifted on resetting of the setting member owing to cooperation with the first guide athwart the adjustment direction of the setting member and then causing a displacement of the adjustment abutment in the positioning direction owing to the cooperation with the second guide.

8. The pressure gage device as set forth in claim 7, wherein the two guide extend with different alignments athwart the adjustment direction of the setting member.

9. The pressure gage device as set forth in claim 7, wherein the linking member and the setting member are in screw threaded engagement with one another.

10. The pressure gage device as set forth in claim 1, wherein the pressure gage is associated with a pressure regulating unit in which the actuating pressure acts as a control pressure.

11. The pressure gage device as set forth in claim 10, further comprising a pressure regulating unit with a regulator housing having a primary pressure inlet, a secondary pressure outlet and a control valve arranged between the primary pressure inlet and the secondary pressure outlet, said valve member of the control valve being drivingly connected with an actuating member, preferably in the form of a diaphragm, said actuating member being subject to the secondary pressure on its side facing the valve member and having its other opposite side delimiting a control chamber, which communicates on the one hand with the pressure gage inlet and on the other hand, via control duct having a choke, with the primary pressure inlet.

12. The pressure gage device as set forth in claim 11, wherein the valve member of the control valve possesses an actuating plunger for cooperation with the actuating member, said plunger being a component of an escape valve serving for letting off such secondary pressure.

13. The pressure gage device as set forth in claim 11, wherein the pressure gage housing possesses a connection pipe adjacent to the pressure gage inlet, such connection pipe serving for screw attachment in a connection opening, communicating with the control chamber, of the regulator housing.

14. The pressure gage device as set forth in claim 1, wherein the venting opening is arranged in the region at the free end of the tube spring and is preferably on the face of the free end of the tube spring.

* * * * *

UNITED STATES PATENT AND TRADEMARK OFFICE
CERTIFICATE OF CORRECTION

PATENT NO. : 5,796,008
DATED : ~~October 5, 1998~~
INVENTOR(S) : Stoll, et al.

It is certified that error appears in the above-identified patent and that said Letters Patent is hereby corrected as shown below:

Column 11, Line 9,      now reads "feasible as well provide",
should read --feasible as well to provide--.

Column 11, Line 12,      now reads "pressure signals current",
should read --pressure signals into current--.

Signed and Sealed this

Twenty-ninth Day of December, 1998

Attest:

BRUCE LEHMAN

*Attesting Officer*      *Commissioner of Patents and Trademarks*